(12) United States Patent
Kikuchi

(10) Patent No.: US 9,678,317 B2
(45) Date of Patent: Jun. 13, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shohei Kikuchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 14/733,117

(22) Filed: Jun. 8, 2015

(65) Prior Publication Data

US 2015/0362710 A1  Dec. 17, 2015

(30) Foreign Application Priority Data

Jun. 13, 2014  (JP) ................................ 2014-122527

(51) Int. Cl.
| | |
|---|---|
| *G02B 9/36* | (2006.01) |
| *G02B 15/16* | (2006.01) |
| *G02B 15/17* | (2006.01) |
| *H04N 5/232* | (2006.01) |

(52) U.S. Cl.
CPC ............ *G02B 15/16* (2013.01); *G02B 15/17* (2013.01); *H04N 5/23296* (2013.01)

(58) Field of Classification Search
CPC ........ G02B 7/021; G02B 15/17; G02B 15/14; G02B 15/16; G02B 13/009; G02B 13/004
USPC ................................................. 359/642–830
See application file for complete search history.

(56) References Cited

U.S. PATENT DOCUMENTS

| | | |
|---|---|---|
| 4,995,708 A | 2/1991 | Sugiura |
| 2002/0018297 A1 | 2/2002 | Usui et al. |
| 2007/0109665 A1 | 5/2007 | Wakazono |
| 2010/0238566 A1 | 9/2010 | Inomoto et al. |

(Continued)

FOREIGN PATENT DOCUMENTS

| | | |
|---|---|---|
| JP | S61-39012 A | 2/1986 |
| JP | H05-45585 A | 2/1993 |

(Continued)

OTHER PUBLICATIONS

Office Action issued in corresponding Japanese Application No. 2014-122527 on Apr. 21, 2016.

(Continued)

*Primary Examiner* — Mahidere Sahle
(74) *Attorney, Agent, or Firm* — Carter, DeLuca, Farrell & Schmidt, LLP

(57) ABSTRACT

A zoom lens including, in order from an object side: a positive first lens unit not moving for zooming; a negative second lens unit moving during zooming; a negative third lens unit moving during zooming; and a fourth lens unit not moving for zooming and including an aperture stop, the fourth lens unit including first and second sub-lens units arranged on object side and image plane side of the aperture stop, respectively, in which a relationship between a maximum height of an axial ray from an optical axis in the first sub-lens unit when focusing at infinity at a wide angle end, and a maximum height of an axial ray at the aperture stop when focusing at infinity at the wide angle end and of full open aperture, and a lateral magnification of the fourth lens unit when focusing at infinity at the wide angle end are appropriately set.

8 Claims, 9 Drawing Sheets

(56) References Cited

U.S. PATENT DOCUMENTS

2012/0250163 A1  10/2012  Wakazono et al.
2013/0235468 A1* 9/2013  Yanai .................. G02B 15/173
                                                         359/687

FOREIGN PATENT DOCUMENTS

| JP | 2009-204655 A | 9/2009 |
| JP | 2010-186179 A | 8/2010 |
| JP | 2011-075646 A | 4/2011 |

OTHER PUBLICATIONS

European Search Report issued in corresponding application No. 15001738.2 on Oct. 27, 2015.

* cited by examiner

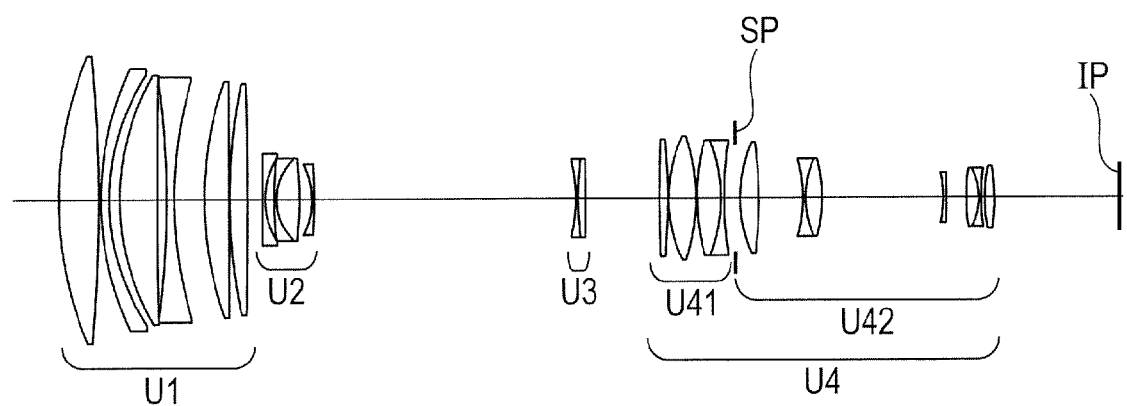
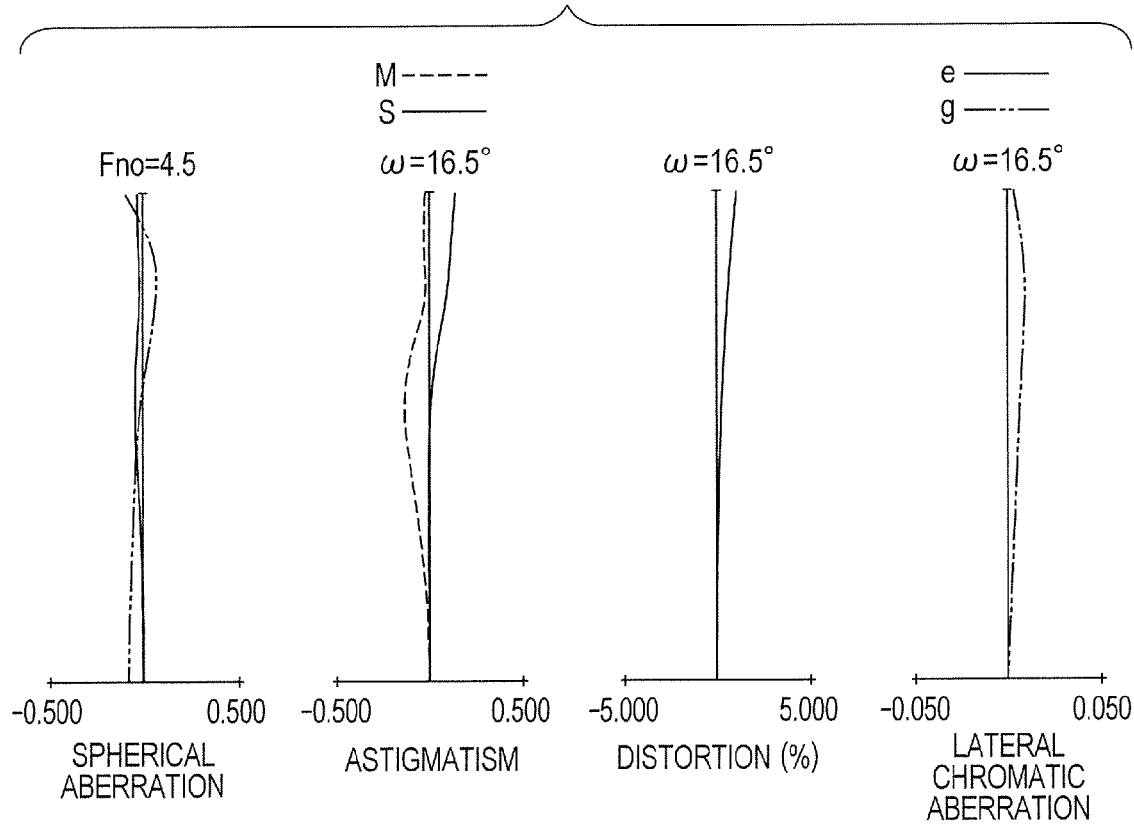

ZOOM LENS AND IMAGE PICKUP APPARATUS INCLUDING THE SAME

BACKGROUND OF THE INVENTION

Field of the Invention

The present invention relates to a zoom lens suitable for a television, camera, a video camera, a film camera, a broadcasting television camera, and a movie camera, and more particularly, to a telephoto zoom lens having a large aperture and a high magnification.

Description of the Related Art

In a case where a nature program or the like is photographed for television program (for example, an animal, a bird, or the like is photographed outdoors from a long distance), a zoom lens that is usable up to a focal length in a super telephoto range at a high zoom ratio (for example, a high magnification of 7× or more and a half angle of field of 3 degrees or less at a telephoto end) and has high optical performance is required. In such photographing, a camera is often carried on a shoulder for photographing, and hence a zoom lens that is smaller in size and lighter in weight and has good portability is required. Moreover, in recent years, in addition to related-art video cameras and broadcasting television cameras, opportunities of photographing moving images are increasing as in a case where a camera for still photography, such as a single lens reflex camera, is also used for photographing a moving image. With a zoom lens for photographing a moving image, a zoom operation or a focus operation is performed during photographing, and hence in a case where a total lens length is changed at the time of the operation, an operation sound becomes noise to affect the photography, which is undesirable. Therefore, a demand for a zoom lens in which a first lens unit is not moved for zooming and which is of an inner focus type is increasing as a zoom lens suitable for moving image photography. In general, a size of a sensor (image pickup element) of the single reflex camera is larger than 1 inch type, and is larger than a sensor having a size of 1 inch type or less, which is mainly used in a video camera or a broadcasting television camera. Therefore, there is an increasing demand for the zoom lens having the high magnification and being usable in the super telephoto range, which is compatible with such a large sensor as to exceed 1 inch type, good in portability and functionality, and suitable for moving image photography.

In U.S. Patent Application Publication No. 2007/0109665, there is proposed a telephoto zoom lens including four lens units, which has an angle of field at the telephoto end of about 0.7 degree and a zoom ratio of about 15×, and is suitable for a ⅔ inch broadcasting television camera.

In U.S. Patent Application Publication No. 2012/0250163, there is proposed a zoom lens including four units, which has an angle of field at the telephoto end of about 3.0 degrees and a zoom ratio of about 10×, and is compatible with a 1 inch type or larger sensor.

In a case where the zoom lens in U.S. Patent Application Publication No. 2007/0109665 adapts to a still larger image pickup element and is increased in zoom ratio while maintaining a large aperture ratio, an effective diameter on an image side of a zoom lens unit is increased, and hence the entire zoom lens is difficult to downsize.

In a case where the zoom lens in U.S. Patent Application Publication No. 2012/0250163 is further increased in telephoto range and zoom ratio while maintaining a total lens length, a diameter of an aperture stop is increased, and hence the entire lens is difficult to downsize.

SUMMARY OF THE INVENTION

It is an object of the present invention to provide a small and lightweight zoom lens, which is compatible with a large sensor (of, for example, 1 inch type or larger), has a high zoom ratio, and is usable in a super telephoto range (for example, has a high magnification of 10× or more and a half angle of field at a telephoto end of 3 degrees or less) by appropriately defining arrangements of a fourth lens unit and an aperture stop.

According to one embodiment of the present invention, there is provided a zoom lens including, in order from an object side to an image side: a first lens unit having a positive refractive power that does not move for zooming; a second lens unit having a negative refractive power that moves during zooming; a third lens unit having a negative refractive power that moves during zooming; and a fourth lens unit having a positive refractive power that does not move for zooming and includes an aperture stop, the fourth lens unit including a first sub-lens unit arranged on the object side of the aperture stop, and a second sub-lens unit arranged on an image plane side of the aperture stop. In the zoom lens, the following conditions are satisfied:

$$1.1 < h41/hap < 2.0$$

$$-3.0 < \beta 4 < -1.8$$

where h41 represents a maximum height of an axial ray from an optical axis in the first sub-lens unit in a state in which focus is at infinity at a wide angle end, hap represents a maximum height of an axial ray from an optical axis at the aperture stop in a state of focusing on at infinity at the wide angle end and of full open aperture, and $\beta 4$ represents a lateral magnification of the fourth lens unit in the state in which focus is at infinity at the wide angle end.

According to the one embodiment of the present invention, as a zoom lens for a large format camera, in particular, there may be obtained the zoom lens which realizes the high zoom ratio and the reductions in size and weight, and has high optical performance over the entire zoom range from the wide angle end to the telephoto end, and an image pickup apparatus including the zoom lens.

Further features of the present invention will become apparent from the following description of exemplary embodiments with reference to the attached drawings.

BRIEF DESCRIPTION OF THE DRAWINGS

FIG. 3 is a lens cross-sectional view when focus is at an object at infinity at a wide angle end in a zoom lens according to Embodiment 2 (Numerical Embodiment 2) of the present invention.

FIG. 4A is a longitudinal aberration diagram at an object distance of infinity at the wide angle end in Embodiment 2 (Numerical Embodiment 2).

DESCRIPTION OF THE EMBODIMENTS

Hereinafter, features of a zoom lens according to the present invention are described with reference to the accompanying drawings.

A zoom lens according to the present invention includes, in order from an object side to an image side: a first lens unit having a positive refractive power that does not move for zooming; a second lens unit having a negative refractive power that moves during zooming; a third lens unit having a negative refractive power that moves for maintaining a position of an image plane fixed; and a fourth lens unit having a positive refractive power that does not move for zooming and includes an aperture stop.

Embodiment 1

Figure 1:
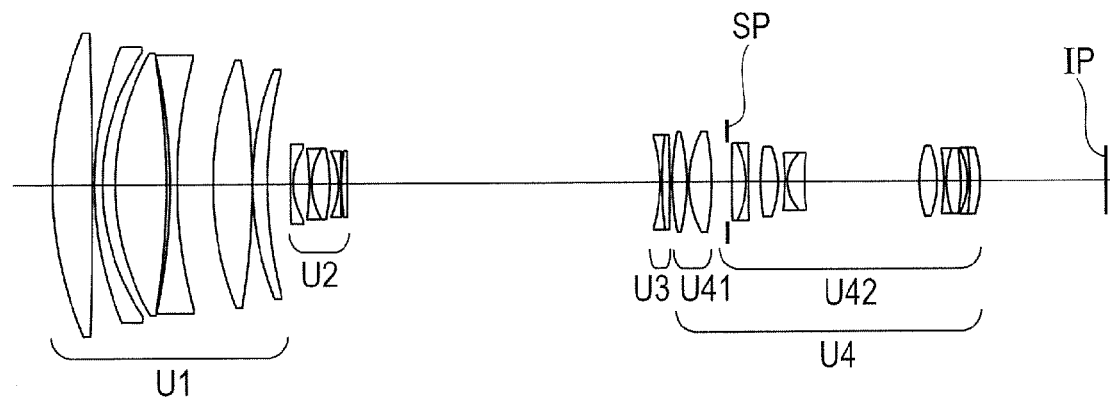
FIG. 1 is a lens cross-sectional view when focus is at an object at infinity at a wide angle end in a zoom lens according to Embodiment 1 (Numerical Embodiment 1) of the present invention.

FIG. 1 is a lens cross-sectional view when focus is at an object at infinity at a wide angle end in a zoom lens according to Embodiment 1 of the present invention. A first lens unit U1 having a positive refractive power is configured not to move for zooming. A part of the first lens unit U1 is configured to move from an image side to an object side for focusing from the object at infinity to an object, at close distance. A second lens unit (variator lens unit) U2 having a negative refractive power for zooming is configured to move from the object side to the image side during zooming from the wide angle end (short focal length end) to a telephoto end (long focal length end). A third lens unit (compensator lens unit) U3 having a negative refractive power is configured to move in conjunction with the second lens unit U2 and correct an image plane variation accompanying zooming (move during zooming). A fourth lens unit (relay lens unit) U4 having a positive refractive power is configured not to move for zooming, and includes an aperture stop SP configured not to move for zooming. A first sub-lens unit U41 of the fourth lens unit is arranged on the object side of the aperture stop SP. A second, sub-lens unit U42 of the fourth lens unit is arranged on an image plane side of the aperture stop SP. A converter (extender) and the like for converting a focal length may be mounted in the second sub-lens unit U42. An image plane IP corresponds to an imaging plane of a solid image pickup element (photoelectric transducer). All of the above-mentioned lens unit-configurations are the same in Embodiments 2, 3, and 4, which are described later.

Next, lens configurations of the lens units in Embodiment 1 are described. In the following, the lenses are arranged in order from the object side to the image side. The first lens unit U1 includes six lenses: a positive lens, a negative lens, a positive lens, a negative lens, a positive lens, and a negative lens. For focus adjustment (focusing), the two lenses on the image side: the positive lens and the negative lens are configured to move. The second lens unit 112 is constituted by one negative lens, a cemented lens of a negative lens and a positive lens, a negative lens, and a positive lens. The third lens unit U3 is constituted by a cemented lens of a negative lens and a positive lens. The first sub-lens unit U41 is constituted by two positive lenses. The second sub-lens unit U42 is constituted by the aperture stop SP, a cemented lens of a positive lens and a negative lens, a positive lens, a cemented lens of a negative lens and a positive lens, a positive lens, and two cemented lenses each including a negative lens and a positive lens.

In general, in a case of a zoom lens including a first lens unit having a positive refractive power, which is configured not to move for zooming, a second lens unit having a negative refractive power, which is configured to move during zooming, and a third lens unit having a negative refractive power, a ray that exits the third lens unit is in a state of being diverged. Therefore, when an aperture stop is arranged right behind the third lens unit, an aperture of the stop is increased. In particular, in a case of a zoom lens having a large aperture and a high zoom ratio, an effect of increasing the aperture diameter becomes large. When the aperture diameter is increased, it becomes difficult to secure a space for storing a stop diaphragm of an aperture stop in a state of full open aperture (state in which the stop is fully open) and a lens barrel becomes thick, and hence it has been difficult to downsize the zoom lens. In the zoom lens according to the present invention, the fourth lens unit and the aperture stop for forming an image may be arranged appropriately to realize both an increase in zoom ratio and reductions in size and weight.

Figure 10A:
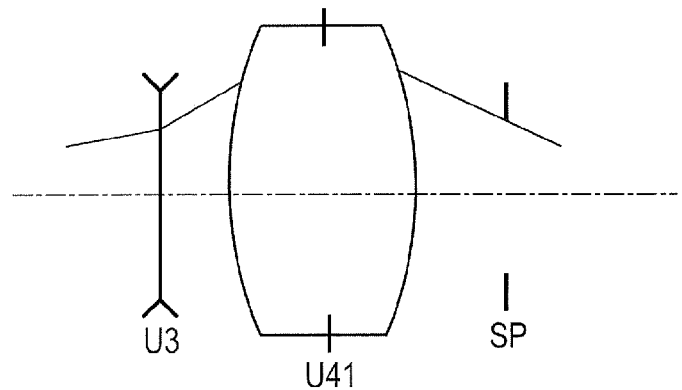
FIG. 10A is a schematic diagram of a principle of the present invention.
Figure 10B:
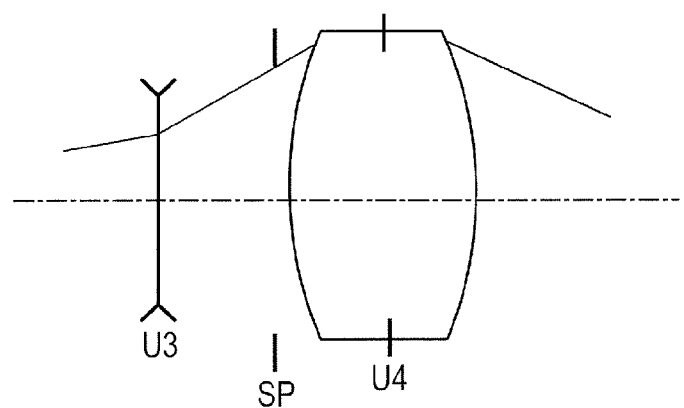
FIG. 10B is a schematic diagram of a structure in the related art.

A principle of the present invention is described with reference to FIG. 10A and FIG. 10B. A schematic configuration around the aperture stop SP of the zoom lens according to the present invention is illustrated in FIG. 10A. FIG. 10B is a schematic diagram for illustrating a configuration of a lens apparatus in the related art to describe advantages of the present invention. As illustrated in FIG. 10B, a ray in a state of being diverged exits the third lens unit U3, and hence in a case of the configuration in the related art in which the aperture stop is arranged right behind the third lens unit, the aperture diameter of the aperture stop is increased. On the other hand, in a case of the configuration according to the present invention in FIG. 10A, the ray that is in the state of being diverged and exits the third lens unit U3 is converted into a ray in a state of being converged in the first sub-lens unit U41. The aperture stop SP may be arranged for the converged ray to suppress the increase in aperture diameter and attain the increase in zoom ratio of the zoom lens.

The zoom lens according to the present invention includes, in order from an object side to an image side, a first lens unit having a positive refractive power, which is configured not to move for zooming, a second lens unit having a negative refractive power, which is configured to move during zooming, a third lens unit having a negative refractive power, which is configured to move for maintaining a position of an image plane fixed, and a fourth lens unit having a positive refractive power, which is configured not to move for zooming and includes an aperture stop. The fourth lens unit includes a first sub-lens unit and a second sub-lens unit arranged on the object side and the image plane side of the aperture stop, respectively. The following conditional expressions are satisfied:

$$1.1 < h41/hap < 2.0 \quad (1)$$

$$-3.0 < \beta 4 < -1.8 \quad (2)$$

where h41 represents a maximum height of an axial ray from an optical axis in the first sub-lens unit (from a lens surface closest to the object side to a lens surface closest to the image side in the first sub-lens unit) in a state in which focus is at infinity at the wide angle end, hap represents a maximum ray height of an axial ray from the optical axis at the aperture stop in a state of focusing on at infinity at the wide angle end and of full open aperture, and β4 represents a lateral magnification of the fourth lens unit in the state in which focus is at infinity at the wide angle end.

The conditional expression (1) defines a ratio of the maximum height of the ray in the first sub-lens unit U41 to the maximum height of the ray in the aperture stop SP in the state of full open aperture. The conditional expression (1) may be satisfied to satisfactorily correct aberration variations of the zoom lens and realize both the suppression of the increase in diameter of the aperture stop SP and the increase in zoom ratio.

When the ratio exceeds the upper limit of the conditional expression (1), large refractive powers are required, for both of the first sub-lens unit U41 and the second sub-lens unit U42, which makes it difficult to correct the aberrations. When the ratio falls below the lower limit of the conditional expression (1), the effect of suppressing the aperture diameter is reduced to lead to an enlargement of the lens barrel. It is more preferred to set the conditional expression (1) as follows:

$$1.1 < h41/hap < 1.7 \quad (1a)$$

The conditional expression (2) defines the lateral magnification of the fourth lens unit.

The conditional expression (2) may be satisfied to suppress the total length of the zoom lens, satisfactorily correct the aberration variations of the zoom lens, and realize both the high zoom ratio and the reductions in size and weight. When the ratio exceeds the upper limit of the conditional expression (2), the lateral magnification of the fourth lens unit becomes small, with the result that the high zoom ratio cannot be attained. Moreover, when the high zoom ratio is to be maintained, the entire zoom length becomes long, which makes it difficult to attain the downsizing of the lens. When the ratio falls below the lower limit of the conditional expression (2), an enlargement ratio of the aberrations of the first to third lens units is increased, which makes it difficult to correct the aberrations. It is more preferred to set the conditional expression (2) as follows:

$$-2.6 < \beta 4 < -2.0 \quad (2a)$$

The above-mentioned conditional expressions are satisfied in Numerical Embodiments of the present invention to realize, despite the zoom lens for a large format camera, the high zoom ratio and the reductions in size and weight by the effect of reducing the aperture stop, and attain the high optical performance over the entire zoom range from the wide angle end to the telephoto end.

As another embodiment of the present invention, a ratio of a focal length of the zoom lens at the telephoto end to a focal length of the fourth lens unit is defined in the conditional expression (3):

$$3.00 < fT/f4 < 30.00 \quad (3)$$

The conditional, expression (3) is satisfied to satisfactorily correct the aberration variations of the zoom lens and realize both the high zoom ratio and the reductions in size and weight. When the ratio exceeds the upper limit of the conditional expression (3), the refractive power of the fourth lens unit becomes too large, which makes it difficult to correct the aberrations. When the ratio falls below the lower limit of the conditional expression (3), the refractive power of the fourth lens unit becomes too weak, which makes it difficult to reduce the total length of the zoom lens to be compact. It is more preferred to set the conditional expression (3) as follows:

$$8.00 < fT/f4 < 20.00 \quad (3a)$$

As another embodiment of the present invention, a ratio of the focal length of the zoom lens at the telephoto end to a focal length of the first lens unit is defined in the conditional expression (4):

$$1.50 < fT/f1 < 10.00 \quad (4)$$

The conditional expression (4) may be satisfied to suppress an axial chromatic aberration, which is problematic at the telephoto end, and a focus shift during zooming, which is caused by a manufacturing error and is problematic in a zoom lens that is usable in a telephoto range and has the high zoom ratio. When the ratio exceeds the upper limit of the conditional expression (4), the focal length of the first lens unit becomes relatively too short with respect to the focal length at the telephoto end, and an enlargement magnification of the first lens unit on a telephoto side becomes too large. In the case where the enlargement magnification of the first lens unit is large, the axial chromatic aberration generated in the first lens unit may no longer be corrected by the second and subsequent lens units, which makes it difficult to obtain high performance on the telephoto side. Further, a lateral magnification of the second lens unit becomes relatively large. In a case where various amounts of the second lens unit, here in particular a focal length, are shifted due to a manufacturing error of the second lens unit, the shift in focal length of the second lens unit also affects an image plane position. Now, when a lateral magnification of the second lens unit is represented by β2, a lateral magnification of the subsequent lens units is represented by βc, and an amount of shift in image position on the second lens unit itself is represented by Δsk2, a variation in imaging position, which is generated in the second lens unit, is enlarged to an amount of focus shift Δsk on an image plane in the following expression:

$$\Delta sk = \Delta sk2 \times (1-\beta2^2) \times \beta c^2 \qquad (A).$$

In regard to the expression (A), in the telephoto zoom lens having a high magnification as in the present invention, magnitudes of both β2 and βc become larger than 1 at the telephoto end. Therefore, when the lateral magnification of the second lens unit becomes relatively large, the manufacturing error of the second lens unit has a larger effect on the image plane position, with the result that the focus shift due to the zooming becomes difficult to suppress, which affects manufacturability.

When the ratio falls below the lower limit of the conditional expression (4), the focal length of the first lens unit becomes too large, which makes it difficult to downsize the first lens unit. It is more preferred to set the conditional expression (4) as follows:

$$2.50 < fT/f1 < 6.30 \qquad (4a).$$

As another embodiment of the present invention, a ratio of the focal length of the first lens unit to a focal length of the second lens unit is defined in the conditional expression (5):

$$-10.00 < f1/f2 < -2.50 \qquad (5).$$

The conditional expression (5) is satisfied to reduce a movement amount of the second lens unit accompanying zooming while satisfactorily correcting the axial chromatic aberration, and reduce a total lens length while attaining the increase in magnification. When the ratio exceeds the upper limit of the conditional expression (5), the focal length of the second lens unit becomes relatively short, which is advantageous for the downsizing but increases the aberration variations accompanying zooming. When the ratio falls below the lower limit of the conditional expression (5), the focal length of the second lens unit becomes relatively long, and hence the movement amount of the second lens unit due to zooming is increased to increase the size of the zoom lens, which makes it difficult to reduce the size and weight. It is more preferred to set the conditional expression (5) as follows:

$$-8.00 < f1/f2 < -4.50 \qquad (5a).$$

As another embodiment of the present invention, it is desired that the first sub-lens unit U41 have at least one aspherical surface. At the wide angle end, an incident ray diverges the most when entering the first sub-lens unit U42, and hence the correction of spherical aberrations becomes the most important. The aspherical surface is arranged in the first sub-lens unit U41 having the large refractive power to advantageously correct the spherical aberrations.

Figure 2A:
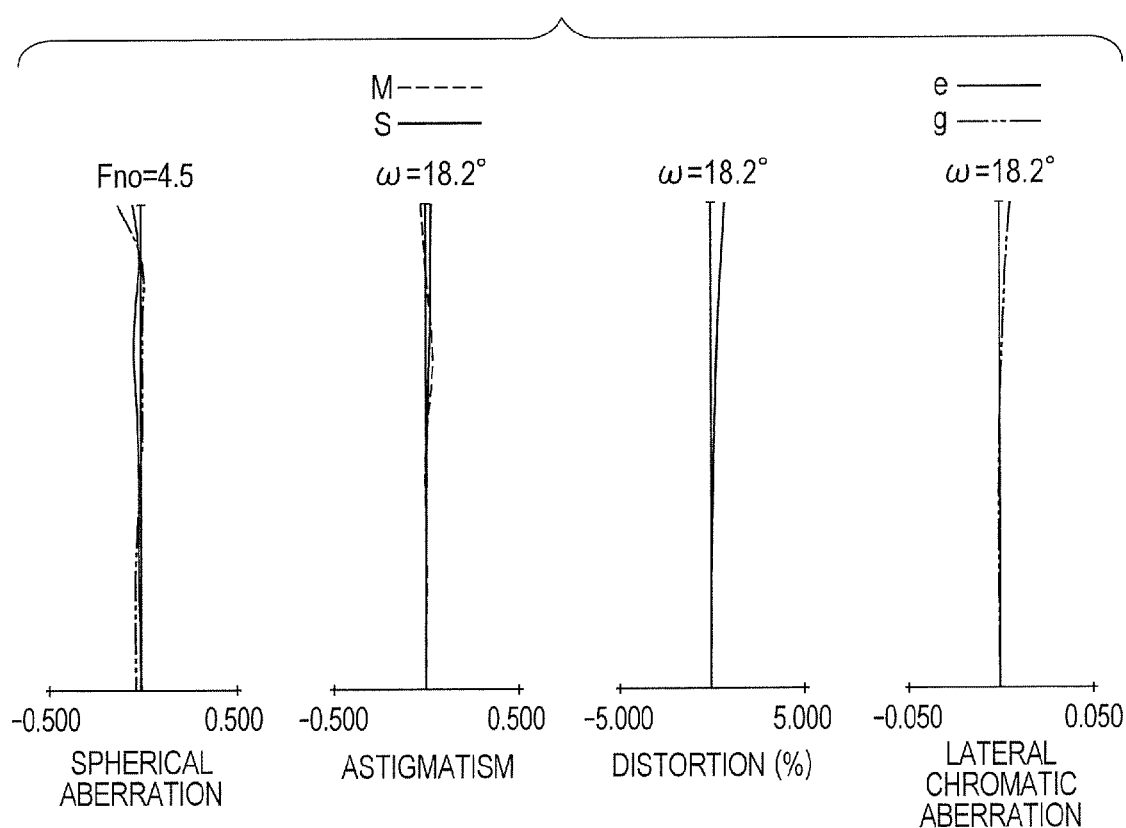
FIG. 2A is a longitudinal aberration diagram at an object distance of infinity at the wide angle end in Embodiment 1 (Numerical Embodiment 1).
Figure 2B:
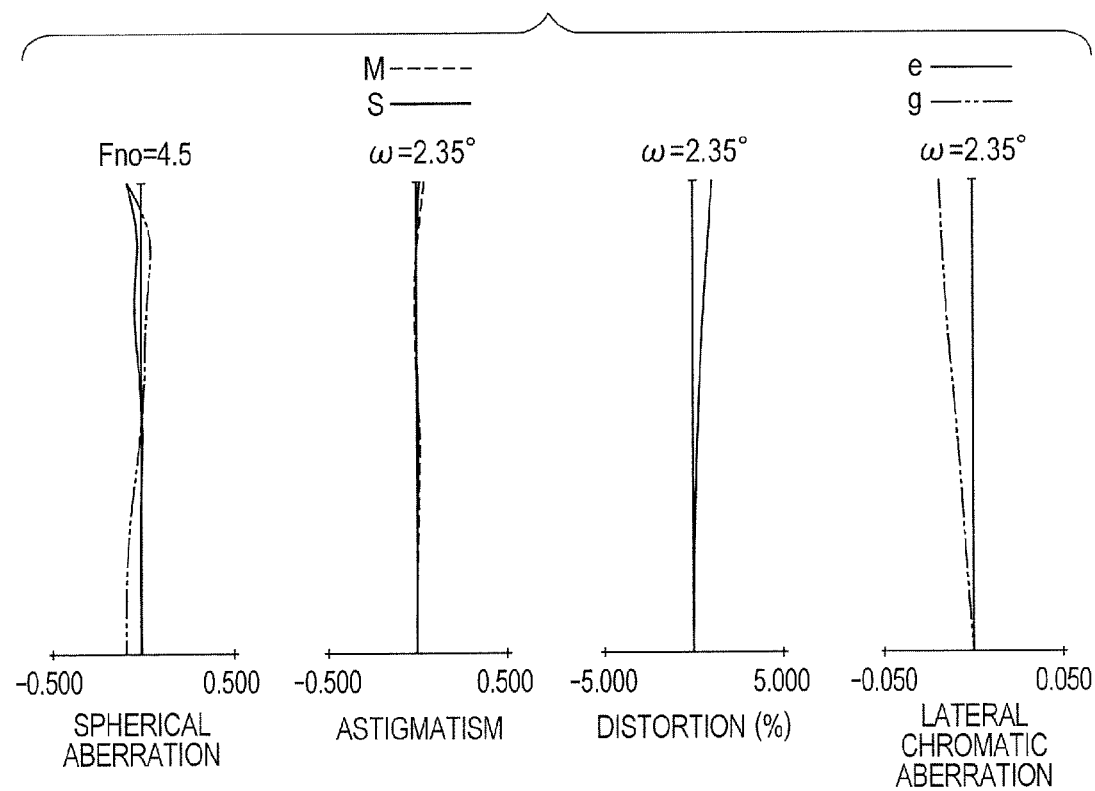
FIG. 2B is a longitudinal aberration diagram at the object distance of infinity at a focal length of 360.00 mm in Embodiment 1 (Numerical Embodiment 1).
Figure 2C:
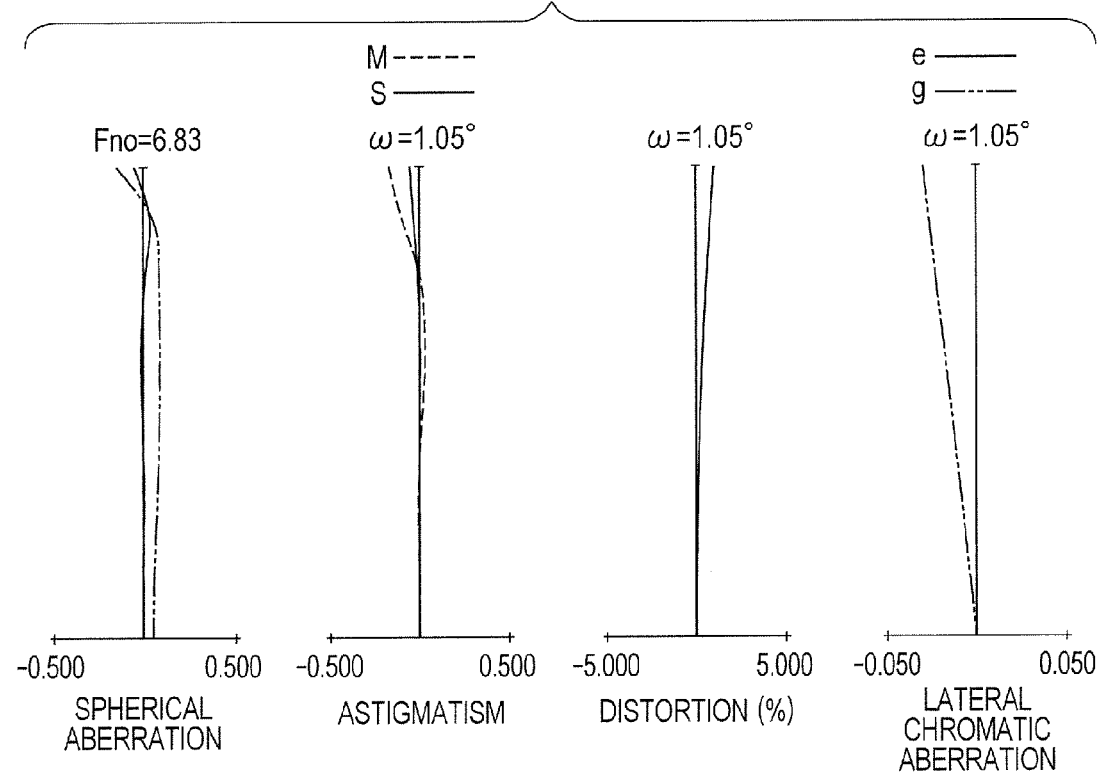
FIG. 2C is a longitudinal aberration diagram at the object distance of infinity at a telephoto end in Embodiment 1 (Numerical Embodiment 1).

FIG. 2A, FIG. 2B, and FIG. 2C are longitudinal aberration diagrams at an object distance of infinity at the wide angle end, a focal length of 360.00 mm, and the telephoto end in Numeral Embodiment 1, respectively. Note, that, the value of the focal length is a value obtained when expressing Numerical Embodiment in units of mm, and the same applies to Numerical Embodiments. In aberration diagrams, the spherical aberration is illustrated with respect to an e-line and a g-line. An astigmatism is illustrated on a meridional image plane (ΔM) with respect to the e-line and on a sagittal image plane (ΔS) with respect to the e-line. A lateral chromatic aberration is expressed by the g-line. In all of the aberration diagrams, the spherical aberration, the astigmatism, the distortion, and the lateral chromatic aberration are drawn on scales of 0.5 mm, 0.5 mm, 5%, and 0.05 mm, respectively. Symbol Fno represents an F-number, and symbol ω represents a half angle of field. Note that, the wide angle end and the telephoto end refer to zoom positions when the second lens unit U2 configured to move during zooming is located at both ends of a range in which the second lens unit U2 is mechanically movable on the optical axis.

The zoom lens in Numerical Embodiment 1 is a zoom lens having a zoom ratio of 18.0, a half angle of field at the wide angle end of 18.2 degrees, a half angle of field at the telephoto end of 1.1 degrees, and a maximum image height, which is determined by a product of the focal length and the half angle of field, of 14.8 mm.

Numerical Embodiment 1 corresponding to Embodiment 1 is described in (Numerical Embodiment 1) below. In Numerical Embodiments, respectively, r represents a curvature radius of each surface counted from the object side, d represents an interval between surfaces, and nd and vd represent a refractive index and an Abbe constant of each optical member. In this case, when an X axis corresponds to the optical axis, an H axis corresponds to an axis perpendicular to the optical axis, a traveling direction of light corresponds to a positive direction, a paraxial curvature radius is represented by R, a conic constant is represented by k, and a spherical coefficients are represented by A4, A6, A8, A10, A12, A14, and A16, an aspherical surface shape is expressed by the following expression.

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16}$$

where e-Z means ×10$^{-Z}$. The mark * represents the aspherical surface.

In Table 1, corresponding values of the conditional expressions of Numerical Embodiment 1 are shown. Numerical Embodiment 1 satisfies all of the conditional expressions (1) to (5) to realize, despite the zoom lens for the large format camera, the high zoom ratio and the reductions in size and weight, and attain the high optical performance over the entire zoom range from the wide angle end to the telephoto end.

Embodiment 2

FIG. 3 is a lens cross-sectional view when focus is at an object at infinity at a wide angle end in a zoom lens according to Embodiment 2.

The zoom lens according to Embodiment 2 has the same lens configurations as those in Embodiment 1 for both of the first lens unit U1 and the third lens unit U3. The second lens unit U2 includes, in order from the object side to the image side, a negative lens, a cemented lens of a negative lens and a positive lens, and a negative lens. The first sub-lens unit U41 includes, in order from the object side to the image side, a positive lens, a positive lens, and a cemented lens of a positive lens and a negative lens. The second sub-lens unit U42 includes, in order from the object side to the image side, the aperture stop SP, a positive lens, one cemented lens of a negative lens and a positive lens, a negative lens, a cemented lens of a positive lens and a negative lens, and a positive lens.

Figure 4B:
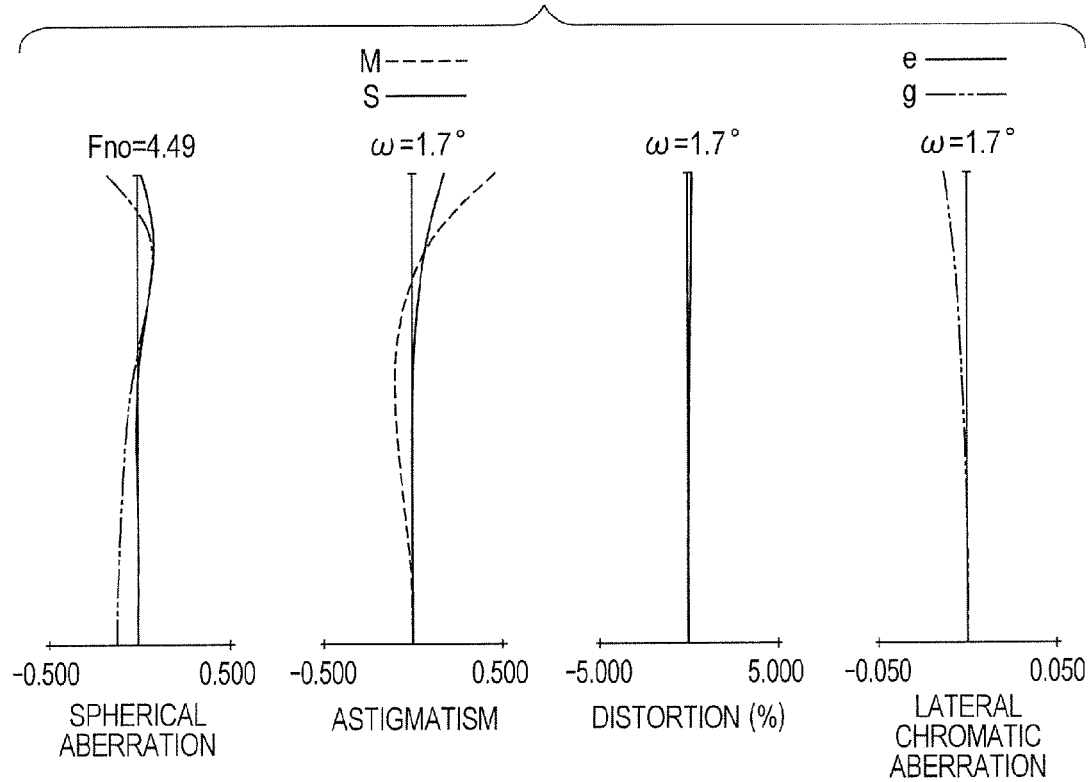
FIG. 4B is a longitudinal aberration diagram at the object distance of infinity at a focal length of 500.00 mm in Embodiment 2 (Numerical Embodiment 2).
Figure 4C:
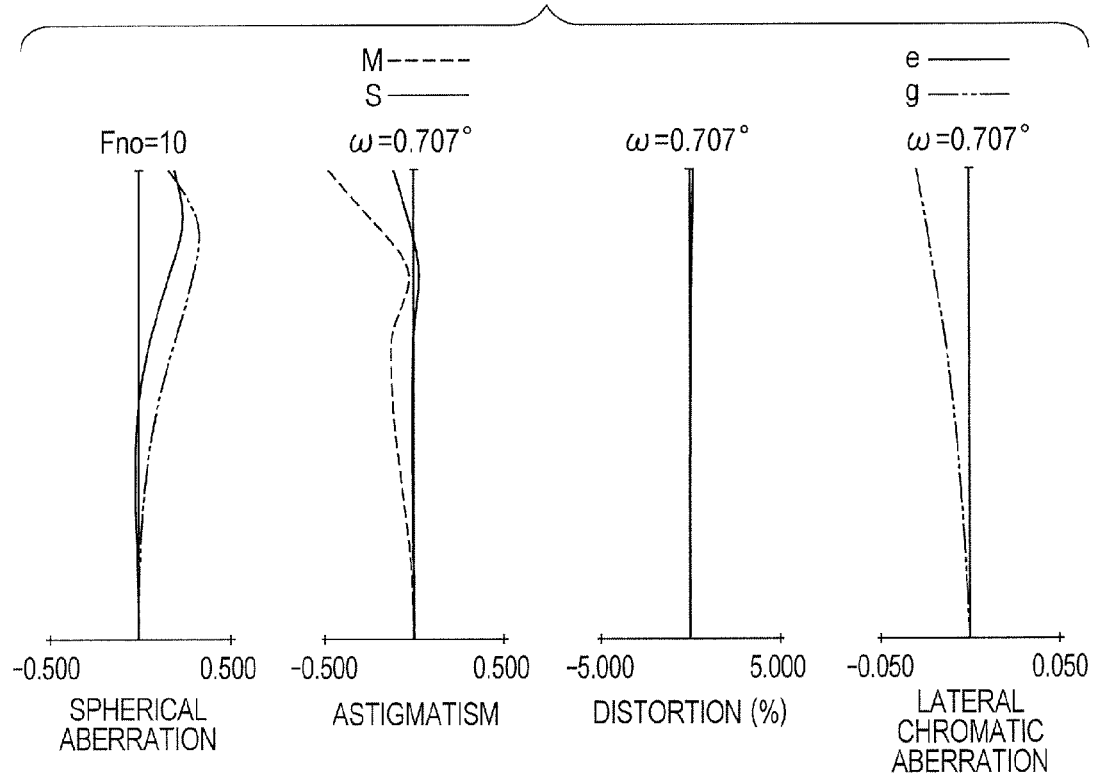
FIG. 4C is a longitudinal aberration diagram at the object distance of infinity at a telephoto end in Embodiment 2 (Numerical Embodiment 2).

FIG. 4A, FIG. 4B, and FIG. 4C are longitudinal aberration diagrams at an object distance of infinity at the wide angle end, a focal length of 500.00 mm, and a telephoto end in Numerical Embodiment 2, respectively. Numerical Embodiment 2 is a zoom lens having a zoom ratio of 24.0×, a half angle of field at the wide angle end of 16.5 degrees, a half angle of field at the telephoto end of 0.7 degree, and a maximum image height of 14.8 mm.

Numerical Embodiment 2 corresponding to Embodiment 2 is described in (Numerical Embodiment 2) below. In Table 1, values corresponding to the conditional expressions in Numerical Embodiment 2 are shown. Numerical Embodiment 2 satisfies all of the conditional expressions (1) to (5) to realize, despite the zoom lens for the large format camera, the high zoom ratio and the reductions in size and weight, and attain the high optical performance over the entire zoom range from the wide angle end to the telephoto end.

Embodiment 3

Figure 5:
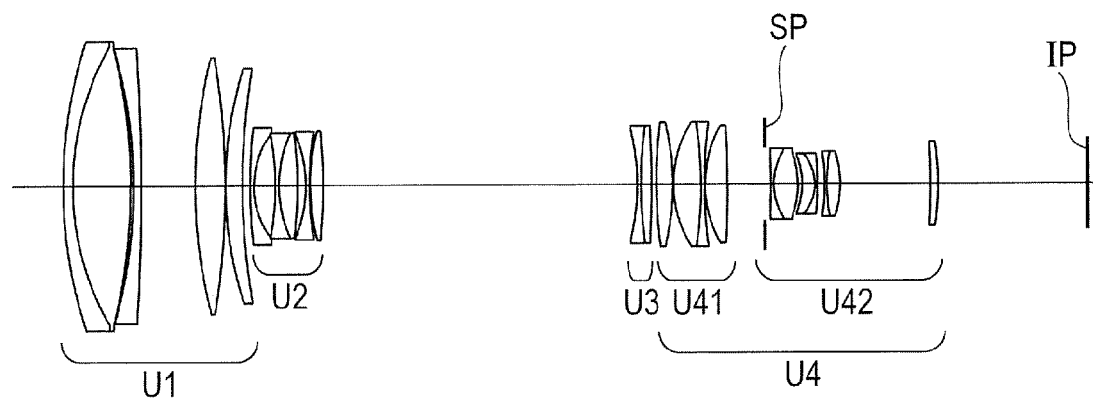
FIG. 5 is a lens cross-sectional view when focus is at an object at infinity at a wide angle end in a zoom lens according to Embodiment 3 (Numerical Embodiment 3) of the present invention.

FIG. 5 is a lens cross-sectional view when focus is at an object at infinity at a wide angle end in a zoom lens according to Embodiment 3.

The zoom lens according to Embodiment 3 has the same lens configurations as those in Embodiment 1 for both of the second lens unit U2 and the third lens unit U3. The first lens unit U1 includes, in order from the object side to the image side, a cemented lens of a negative lens and a positive lens, a negative lens, and two positive lenses. The two positive lenses on the image plane side are configured to move for the focus adjustment. The first sub-lens unit U41 includes, in order from the object side to the image side, a positive lens, a cemented lens of a positive lens and a negative lens, and a positive lens. The second sub-lens unit U42 includes, in order from the object side to the image side, the aperture stop SP, a cemented lens of a negative lens and a positive lens, a cemented lens of a positive lens and a negative lens, a cemented lens of a negative lens and a positive tens, and a positive lens.

Figure 6A:
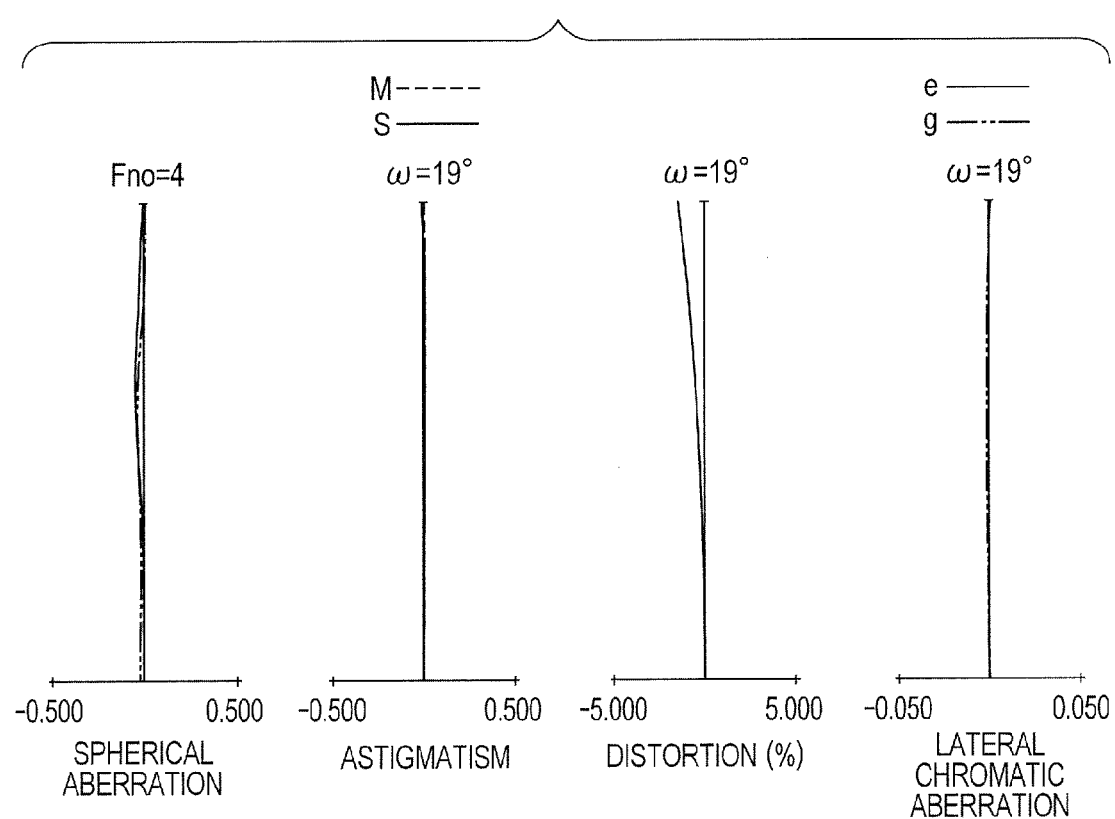
FIG. 6A is a longitudinal aberration diagram at an object distance of infinity at the wide angle end in Embodiment 3 (Numerical Embodiment 3).
Figure 6B:
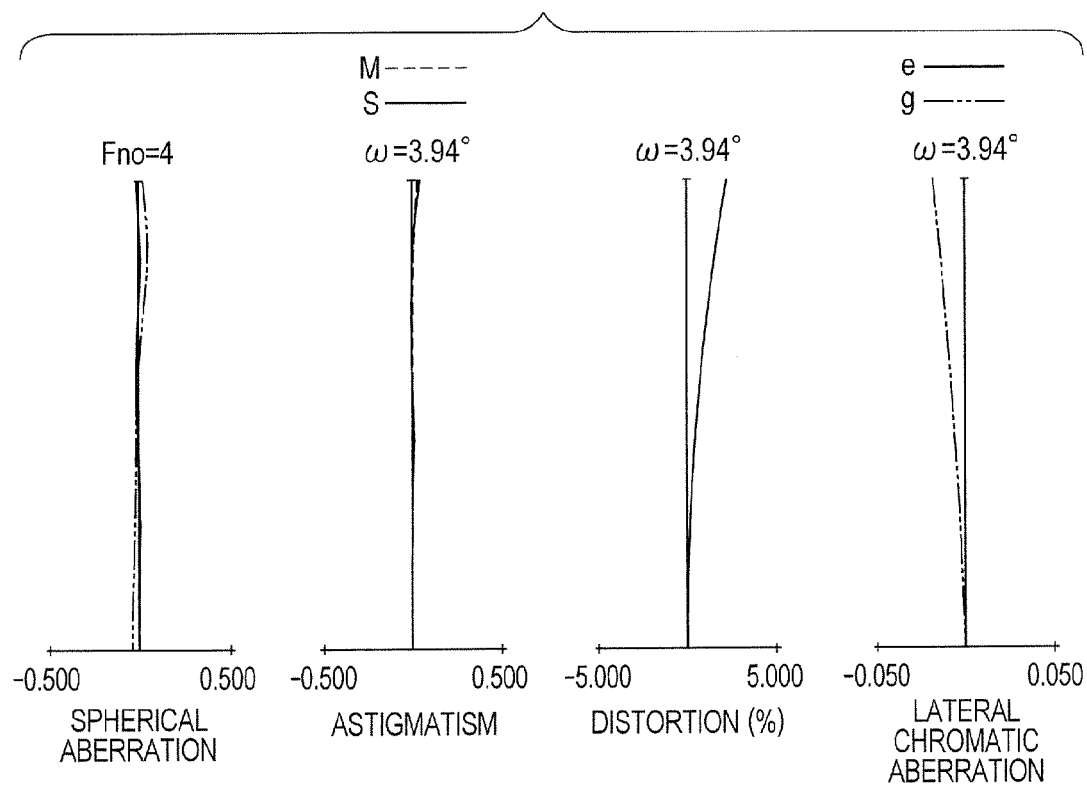
FIG. 6B is a longitudinal aberration diagram at the object distance of infinity at a focal length of 225.00 mm in Embodiment 3 (Numerical Embodiment 3).
Figure 6C:
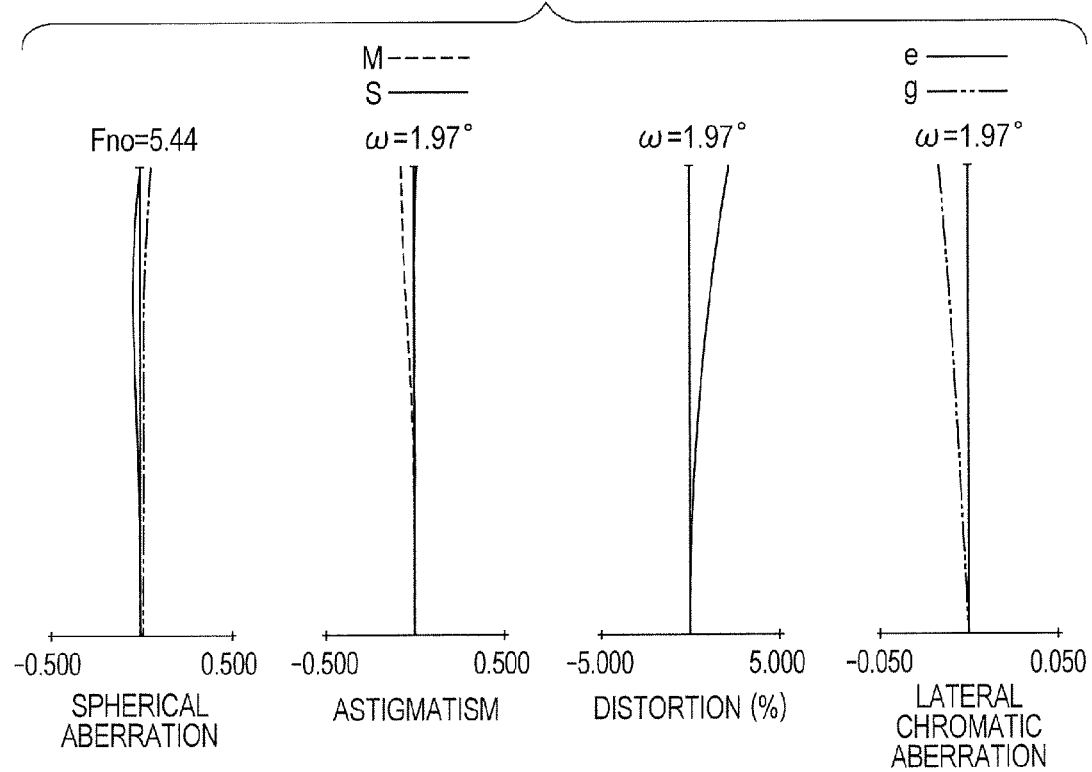
FIG. 6C is a longitudinal aberration diagram at the object distance of infinity at a telephoto end in Embodiment 3 (Numerical Embodiment 3).

FIG. 6A, FIG. 6B, and FIG. 6C are longitudinal aberration diagrams at an object distance of infinity at the wide angle end, a focal length of 225.00 mm, and a telephoto end in Numerical Embodiment 3, respectively. Numerical Embodiment 3 is a zoom lens having a zoom ratio of 10.0×, a half angle of field at the wide angle end of 19.0 degrees, a half angle of field at the telephoto end of 2.0 degrees, and a maximum image height of 15.5 mm.

Numerical Embodiment 3 corresponding to Embodiment 3 is described in (Numerical Embodiment 3) below. In Table 1, values corresponding to the conditional expressions in Numerical Embodiment 3 are shown. Numerical Embodiment 3 satisfies all of the conditional expressions (1) to (5) to realize, despite the zoom lens for the large format camera, the high zoom ratio and the reductions in size and weight, and attain the high optical performance over the entire zoom range from the wide angle end to the telephoto end.

Embodiment 4

Figure 7:
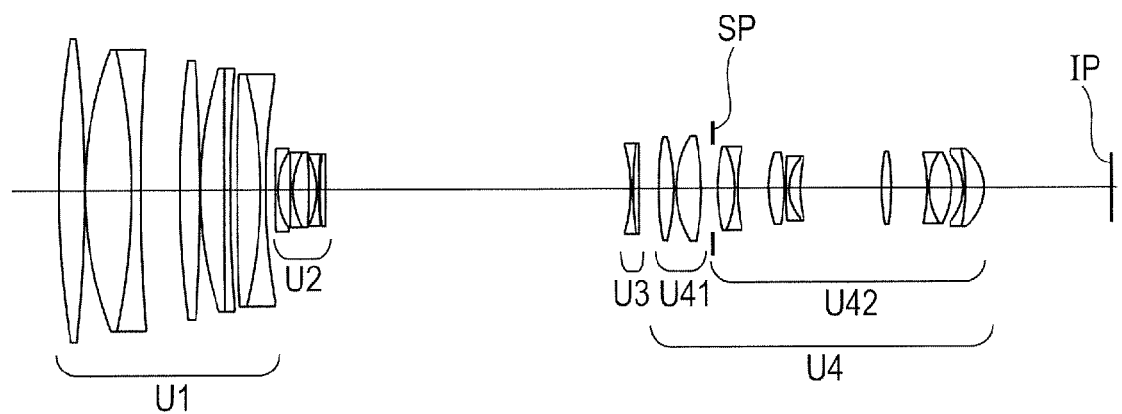
FIG. 7 is a lens cross-sectional view when focus is at an object at infinity at a wide angle end in a zoom lens according to Embodiment 4 (Numerical Embodiment 4) of the present invention.

FIG. 7 is a lens cross-sectional view when focus is at an object at infinity at a wide angle end in a zoom lens according to Embodiment 4.

The zoom lens according to Embodiment 4 has the same lens configurations as those in Embodiment 1 for all of the second lens unit U2, the third lens unit U3, and the fourth lens unit U4. The first lens unit U1 includes, in order from the object side to the image side, a positive lens configured not to move for the focus adjustment, a cemented lens of a positive lens and a negative lens, a positive lens and a cemented lens of a positive lens and a negative lens, which are configured to move for the focus adjustment, and a cemented lens of a positive lens and a negative lens configured not to move for the focus adjustment.

Figure 8A:
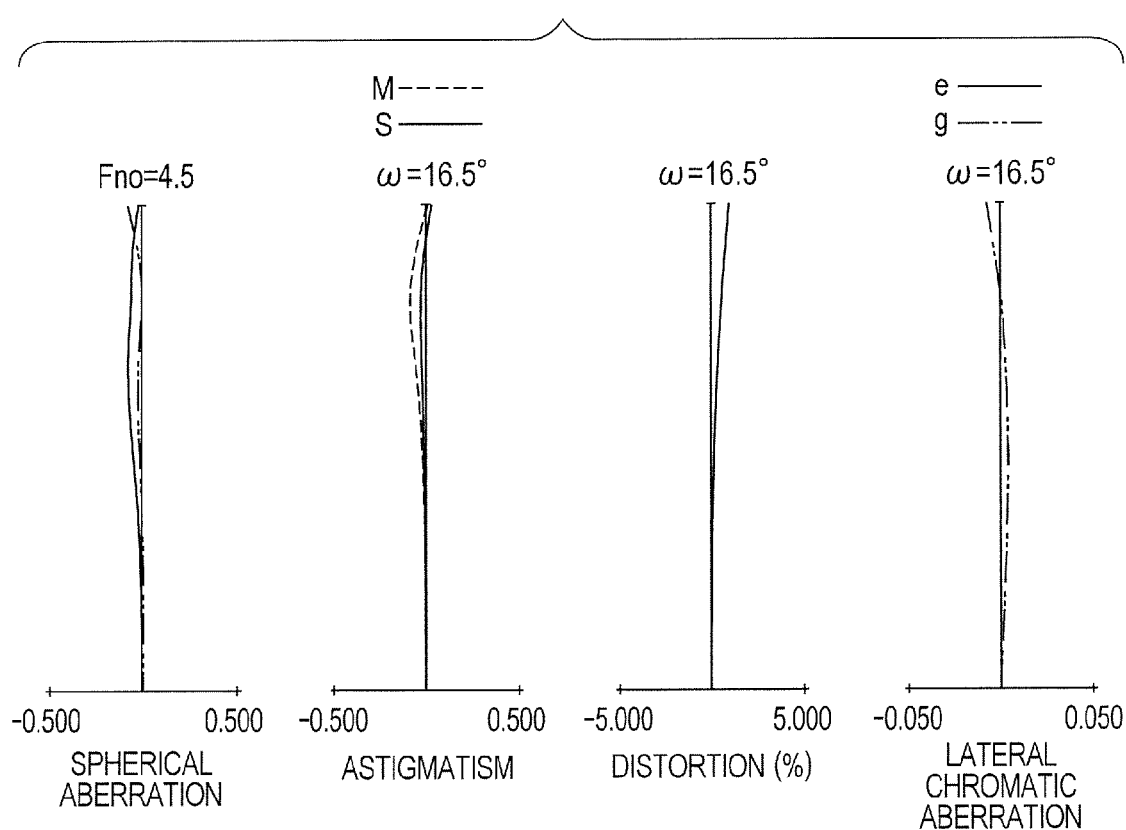
FIG. 8A is a longitudinal aberration diagram at an object distance of infinity at the wide angle end in Embodiment 4 (Numerical Embodiment 4).
Figure 8B:
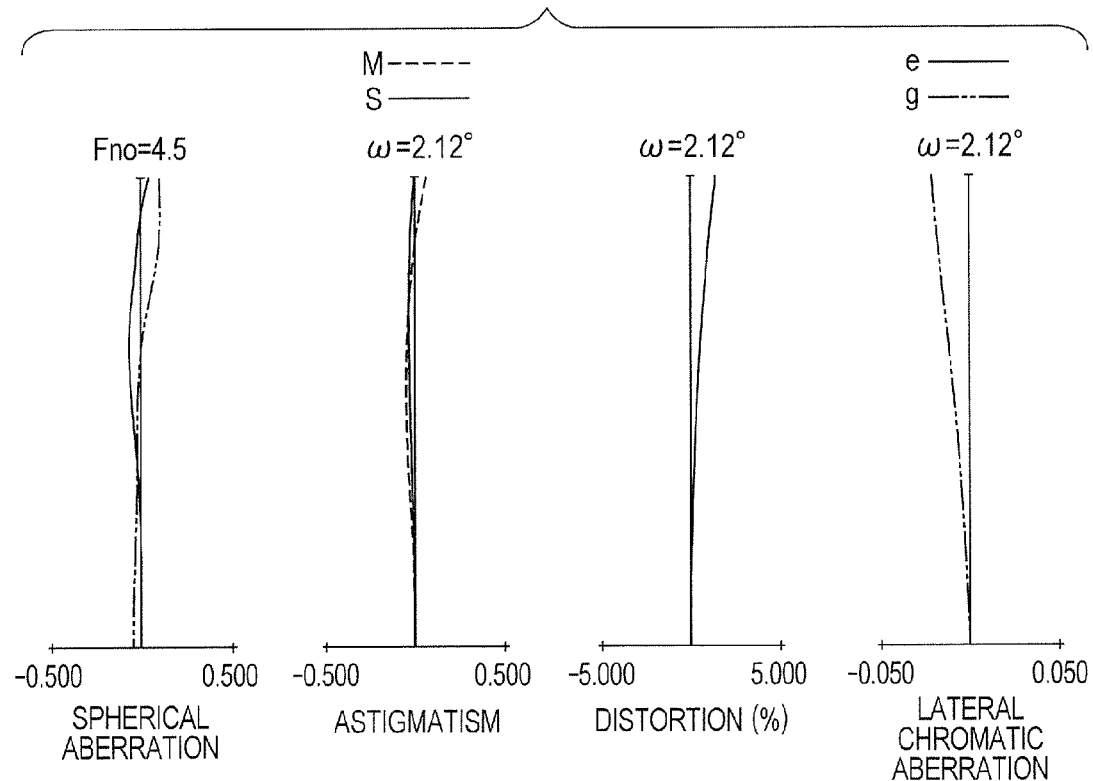
FIG. 8B is a longitudinal aberration diagram at the object distance of infinity at a focal length of 400.00 mm in Embodiment 4 (Numerical Embodiment 4).
Figure 8C:
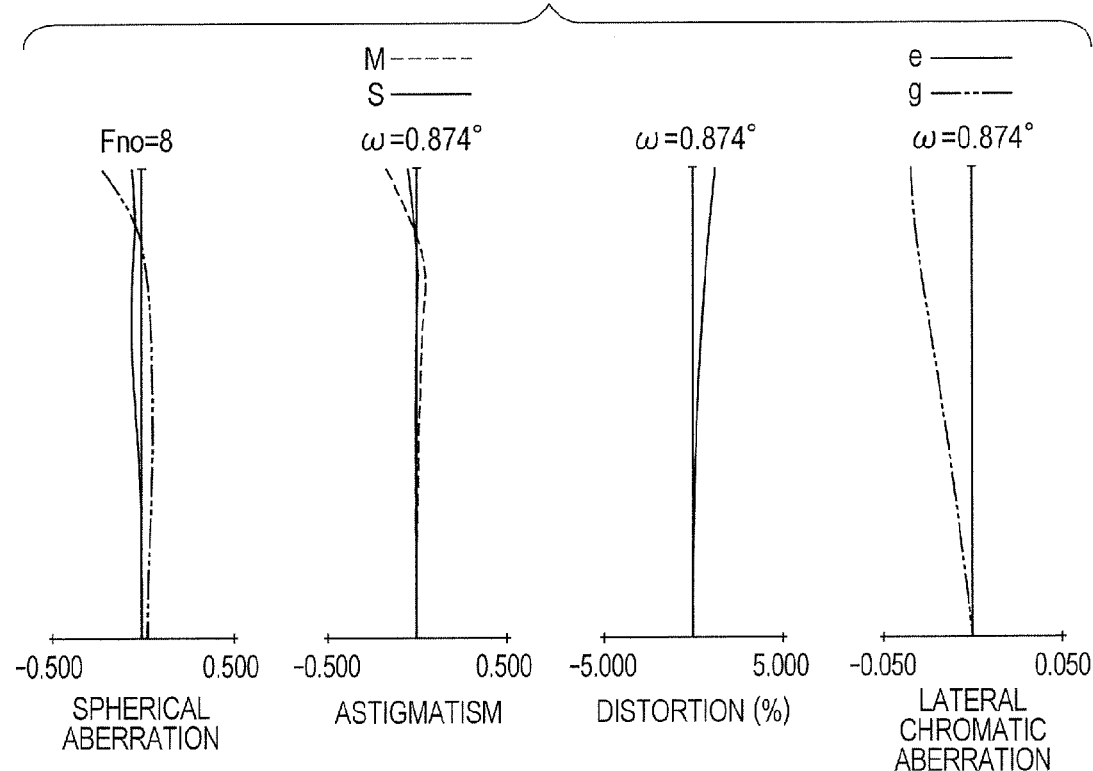
FIG. 8C is a longitudinal aberration diagram at the object distance of infinity at a telephoto end in Embodiment 4 (Numerical Embodiment 4).

FIG. 8A, FIG. 8B, and FIG. 8C are longitudinal aberration diagrams at an object distance of infinity at the wide angle end, a focal length of 400.00 mm, and a telephoto end in Numerical Embodiment 4, respectively. Numerical Embodiment 4 is a zoom lens having a zoom ratio of 19.4×, a half angle of field at the wide angle end of 16.5 degrees, a half angle of field at the telephoto end of 0.9 degree, and a maximum image height of 14.8 mm.

Numerical Embodiment 4 corresponding to Embodiment 4 is described in (Numerical Embodiment 4) below. In Table 1, values corresponding to the conditional expressions in Numerical Embodiment 4 are shown. Numerical Embodiment 4 satisfies all of the conditional expressions (1) to (5) to realize, despite the zoom lens for the large format camera, the high zoom ratio and the reductions in size and weight, and attain the high optical performance over the entire zoom range from the wide angle end to the telephoto end.

(Image Pickup Apparatus)

Figure 9:
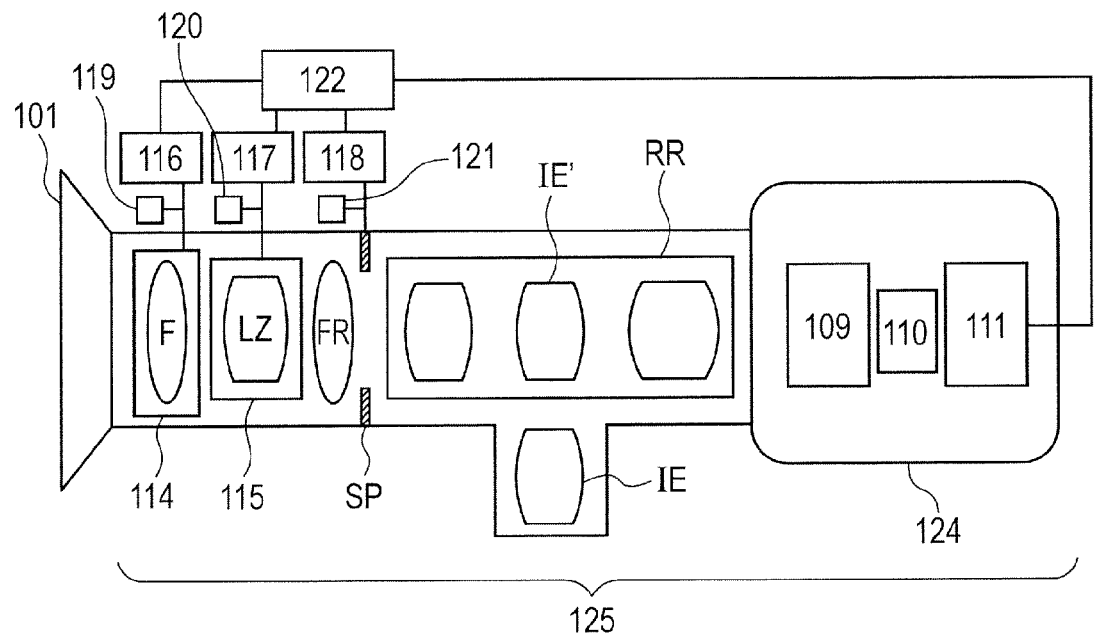
FIG. 9 is a schematic diagram of a main part, of an image pickup apparatus according to the present invention.

FIG. 9 is a schematic diagram of a main part of an image pickup apparatus (television camera system) using the zoom lens according to any one of Embodiments 1 to 4 of the present invention as an image pickup optical system. A zoom lens 101 that is the zoom lens according to any one of Embodiments 1 to 4 is illustrated in FIG. 9. The zoom lens 101 may be detachably mounted on a camera body 124, to thereby construct an image pickup apparatus 125. The zoom lens 101 includes a first lens unit F, a zoom portion LZ, and a fourth lens unit (FR, SP, RR) for imagine. The first lens unit F includes a lens unit for focusing.

The zoom portion LZ includes a second lens unit configured to move on the optical axis during zooming, and a third lens unit configured to move on the optical axis to correct the image plane variation accompanying zooming. The zoom lens 101 further includes a first sub-lens unit FR configured not to move for zooming, an aperture stop SP, and a second sub-lens unit RR. The fourth lens unit (FR, SP, RR) includes lens units IE' and IE that may be retractably inserted in an optical path. The lens units IE and IE' are switched to displace a focal length range of the zoom lens 101. Drive mechanisms 114 and 115, such as a helicoid and a cam, drive the first lens unit F and the zoom portion LZ in an optical axis direction, respectively. Motors (drive units) 116 to 118 electrically drive the drive mechanisms 114 and 115 and the aperture stop SP.

Detectors 119 to 121, such as an encoder, a potentiometer, or a photo-sensor, are configured to detect positions of the first lens unit F and the zoom portion LZ on the optical axis, and an aperture diameter of the aperture stop SP. The camera 124 includes a glass block 109, which corresponds to an optical filter or a color separation optical system provided within the camera 124. Further, the camera 124 includes an image pickup element (photoelectric transducer) 110, such as a charge-coupled device (CCD) sensor or a complementary metal-oxide semiconductor (CMOS) sensor. The image pickup element 110 is configured to photoelectrically convert a subject image (optical image) formed by the zoom lens 101. Further, central processing units (CPUs) 111 and 122 control the driving of the camera 124 and the zoom lens 101.

By applying the zoom lens according to the present invention to a television camera as described above, the image pickup apparatus having the high optical performance may be realized.

The exemplary embodiments of the present invention are described above, but the present invention is not limited to those embodiments and can be modified and changed variously within the scope of the gist thereof.

Numerical Embodiment 1

Unit mm

Surface data

| Surface number | r | d | nd | vd | Effective diameter |
|---|---|---|---|---|---|
| 1 | 171.566 | 17.30 | 1.48749 | 70.2 | 127.99 |
| 2 | −2020.966 | 1.00 | | | 126.24 |
| 3 | 160.873 | 3.40 | 1.72916 | 54.7 | 116.87 |
| 4 | 103.410 | 5.64 | | | 111.47 |
| 5 | 116.704 | 22.15 | 1.43387 | 95.1 | 110.98 |
| 6 | −335.843 | 1.50 | | | 109.47 |
| 7 | −267.352 | 3.20 | 1.72916 | 54.7 | 109.18 |
| 8 | 214.311 | 15.52 | | | 105.48 |
| 9 | 151.203 | 17.14 | 1.43387 | 95.1 | 104.61 |
| 10 | −319.974 | 0.20 | | | 103.71 |
| 11 | 137.411 | 6.49 | 1.43387 | 95.1 | 96.73 |
| 12 | 204.597 | (Variable) | | | 94.79 |
| 13* | −16816.966 | 1.20 | 1.77250 | 49.6 | 33.29 |
| 14 | 29.929 | 7.11 | | | 29.98 |
| 15 | −104.154 | 1.00 | 1.61800 | 63.3 | 29.37 |
| 16 | 30.718 | 7.91 | 1.72047 | 34.7 | 28.98 |
| 17 | −67.474 | 3.62 | | | 28.62 |
| 18 | −34.029 | 1.00 | 1.61800 | 63.3 | 27.30 |
| 19 | 450.776 | 0.20 | | | 27.36 |
| 20 | 93.693 | 2.63 | 1.54814 | 45.8 | 27.42 |
| 21 | −6580.233 | (Variable) | | | 27.54 |
| 22 | −68.940 | 1.00 | 1.72916 | 54.7 | 37.31 |
| 23 | 166.734 | 3.39 | 1.84666 | 23.8 | 38.97 |
| 24 | −941.897 | (Variable) | | | 39.61 |
| 25 | 109.548 | 6.39 | 1.59349 | 67.0 | 41.38 |
| 26* | −84.491 | 1.00 | | | 41.75 |
| 27 | 47.765 | 9.81 | 1.61800 | 63.3 | 42.20 |
| 28 | −118.118 | 6.92 | | | 41.16 |
| 29 (Stop) | ∞ | 2.00 | | | 33.82 |
| 30 | 647.610 | 6.06 | 1.43875 | 94.9 | 31.97 |
| 31 | −36.685 | 1.20 | 2.00330 | 28.3 | 30.50 |
| 32 | 776.497 | 4.99 | | | 29.98 |
| 33 | 97.392 | 7.65 | 1.56732 | 42.8 | 28.86 |
| 34 | −43.937 | 3.12 | | | 27.88 |
| 35 | −89.504 | 1.20 | 2.00100 | 29.1 | 23.97 |
| 36 | 17.948 | 7.35 | 1.84666 | 23.8 | 22.49 |
| 37 | 104.985 | 50.00 | | | 21.92 |
| 38 | 46.809 | 7.83 | 1.48749 | 70.2 | 29.16 |
| 39 | −43.713 | 3.00 | | | 28.97 |
| 40 | −88.859 | 1.00 | 1.83431 | 42.7 | 26.91 |
| 41 | 46.519 | 6.34 | 1.72825 | 28.5 | 26.50 |
| 42 | −96.270 | 2.84 | | | 26.25 |
| 43 | −31.300 | 1.00 | 1.88300 | 40.8 | 25.94 |
| 44 | −100.302 | 4.54 | 1.64769 | 33.8 | 26.68 |
| 45 | −48.713 | (BF) | | | 27.55 |
| Image plane | ∞ | | | | |

Aspherical surface data

Thirteenth surface $K = 9.73498e+005$  $A4 = 2.31247e-006$  $A6 = 4.19291e-010$  $A8 = -5.17688e-012$
$A10 = -6.87050e-014$  $A12 = 8.08198e-016$  $A14 = -2.95438e-018$  $A16 = -3.78802e-021$ Twenty-sixth surface $K = -1.02447e+000$  $A4 = 8.56896e-007$  $A6 = 4.82804e-010$  $A8 = -1.11536e-012$
$A10 = 3.74032e-015$  $A12 = -2.44824e-018$  $A14 = -5.57191e-021$  $A16 = 7.94532e-024$ Various data
Zoom ratio 18.00

| | Wide angle | Intermediate | Telephoto |
|---|---|---|---|
| Focal length | 45.00 | 360.00 | 810.00 |
| F-number | 4.50 | 4.50 | 6.83 |
| Half angle of field | 18.21 | 2.35 | 1.05 |
| Image height | 14.80 | 14.80 | 14.80 |
| Total lens length | 458.75 | 458.75 | 458.75 |

-continued

| Unit mm | | | |
|---|---|---|---|
| BF | 55.00 | 55.00 | 55.00 |
| d12 | 10.00 | 116.76 | 133.26 |
| d21 | 135.90 | 9.26 | 10.50 |
| d24 | 1.00 | 20.87 | 3.14 |
| Incident pupil position | 166.49 | 1185.81 | 2300.95 |
| Exit pupil position | −128.10 | −128.10 | −128.10 |
| Front principal point position | 200.43 | 838.00 | −472.33 |
| Rear principal point position | 10.00 | −305.00 | −755.00 |

Zoom lens unit data

| Unit | First surface | Focal length | Lens structure length | Front principal point position | Rear principal point position |
|---|---|---|---|---|---|
| 1 | 1 | 216.70 | 93.54 | 36.17 | −42.41 |
| 2 | 13 | −30.00 | 24.67 | 3.39 | −14.40 |
| 3 | 22 | −111.70 | 4.39 | −0.29 | −2.70 |
| 4 | 25 | 57.66 | 134.26 | 7.85 | −142.30 |

Single lens data

| Lens | First surface | Focal length |
|---|---|---|
| 1 | 1 | 324.14 |
| 2 | 3 | −405.46 |
| 3 | 5 | 202.12 |
| 4 | 7 | −161.98 |
| 5 | 9 | 238.70 |
| 6 | 11 | 934.65 |
| 7 | 13 | −38.49 |
| 8 | 15 | −38.13 |
| 9 | 16 | 30.12 |
| 10 | 18 | −50.97 |
| 11 | 20 | 167.68 |
| 12 | 22 | −66.48 |
| 13 | 23 | 165.91 |
| 14 | 25 | 81.08 |
| 15 | 27 | 56.10 |
| 16 | 30 | 79.15 |
| 17 | 31 | −34.60 |
| 18 | 33 | 54.14 |
| 19 | 35 | −14.73 |
| 20 | 36 | 24.37 |
| 21 | 38 | 47.56 |
| 22 | 40 | −36.25 |
| 23 | 41 | 43.53 |
| 24 | 43 | −51.58 |
| 25 | 44 | 140.34 |

Numerical Embodiment 2

Unit mm

Surface data

| Surface number | r | d | nd | vd | Effective diameter |
|---|---|---|---|---|---|
| 1 | 163.528 | 17.53 | 1.49700 | 81.5 | 121.93 |
| 2 | −673.882 | 1.00 | | | 120.52 |
| 3 | 135.037 | 3.70 | 1.77250 | 49.6 | 111.44 |
| 4 | 100.355 | 4.59 | | | 106.76 |
| 5 | 108.786 | 16.31 | 1.43387 | 95.1 | 106.00 |
| 6 | 2381.643 | 4.35 | | | 104.44 |
| 7 | −382.047 | 3.20 | 1.77250 | 49.6 | 104.30 |
| 8 | 183.501 | 13.20 | | | 100.76 |
| 9 | 157.156 | 10.86 | 1.49700 | 81.5 | 100.53 |
| 10 | −12135.290 | 0.20 | | | 99.95 |
| 11 | 252.223 | 7.96 | 1.49700 | 81.5 | 98.13 |
| 12 | −1829.629 | (Variable) | | | 97.21 |
| 13* | −476.807 | 1.20 | 1.72916 | 54.7 | 38.72 |
| 14 | 33.366 | 4.08 | | | 34.75 |
| 15 | 163.349 | 1.00 | 1.61800 | 63.3 | 34.72 |
| 16 | 25.003 | 10.15 | 1.72047 | 34.7 | 33.07 |
| 17 | −142.539 | 5.31 | | | 32.04 |
| 18 | −34.777 | 1.00 | 1.69680 | 55.5 | 29.67 |
| 19 | −269.964 | (Variable) | | | 29.60 |
| 20 | −70.407 | 1.00 | 1.72916 | 54.7 | 31.24 |
| 21 | 141.360 | 2.95 | 1.34666 | 23.8 | 32.35 |
| 22 | −5387.417 | (Variable) | | | 32.88 |
| 23 | 608.617 | 3.68 | 1.51633 | 64.1 | 49.35 |
| 24* | −214.177 | 0.20 | | | 49.94 |
| 25 | 61.906 | 11.98 | 1.49700 | 81.5 | 52.67 |
| 26 | −86.144 | 0.50 | | | 52.52 |
| 27 | 92.723 | 10.45 | 1.43875 | 94.9 | 48.89 |
| 28 | −69.566 | 1.50 | 2.00100 | 29.1 | 47.43 |
| 29 | 159.602 | 5.06 | | | 46.55 |
| 30 (Stop) | ∞ | 2.00 | | | 46.74 |
| 31 | 61.251 | 8.19 | 1.68893 | 31.1 | 47.11 |
| 32 | −183.670 | 19.21 | | | 46.51 |
| 33 | −64.343 | 1.20 | 2.00100 | 29.1 | 32.74 |
| 34 | 41.407 | 7.29 | 1.76182 | 26.5 | 32.31 |

-continued

Unit mm

| | | | | | |
|---|---|---|---|---|---|
| 35 | −66.209 | 53.12 | | | 32.39 |
| 36 | −50.541 | 1.50 | 2.00100 | 29.1 | 20.34 |
| 37 | −152.778 | 8.68 | | | 20.79 |
| 38 | 87.153 | 5.68 | 1.76182 | 26.5 | 23.58 |
| 39 | −25.761 | 1.00 | 2.00100 | 29.1 | 23.65 |
| 40 | 107.046 | 1.42 | | | 24.36 |
| 41 | 64.341 | 4.19 | 1.67270 | 32.1 | 25.50 |
| 42 | −91.204 | (BF) | | | 25.82 |
| Image plane | ∞ | | | | |

Aspherical surface data

Thirteenth surface

K = 0.00000e+000    A4 = 3.52166e−006    A6 = −9.04430e−010
A8 = −4.01975e−014  A10 = 2.11683e−015   A12 = −4.10839e−019

Twenty-fourth surface

K = −8.40684e−001   A4 = 5.82961e−007    A6 = 1.12421e−010
A8 = 2.39096e−013   A10 = −2.88892e−016  A12 = 2.42509e−019

Various data
Zoom ratio 24.00

| | Wide angle | Intermediate | Telephoto |
|---|---|---|---|
| Focal length | 50.00 | 500.00 | 1200.00 |
| F-number | 4.50 | 4.49 | 10.00 |
| Half angle of field | 16.49 | 1.70 | 0.71 |
| Image height | 14.80 | 14.80 | 14.80 |
| Total lens length | 465.00 | 465.00 | 465.00 |
| BF | 55.00 | 55.00 | 55.00 |
| d12 | 6.31 | 109.89 | 122.42 |
| d19 | 114.62 | 3.35 | 26.63 |
| d22 | 32.62 | 40.31 | 2.50 |
| Incident pupil position | 168.58 | 1476.41 | 3303.63 |
| Exit pupil position | −101.85 | −101.85 | −101.85 |
| Front principal point position | 202.64 | 382.51 | −4677.24 |
| Rear principal point position | 5.00 | −445.00 | −1145.00 |

Zoom lens unit data

| Unit | First surface | Focal length | Lens structure length | Front principal point position | Rear principal point position |
|---|---|---|---|---|---|
| 1 | 1 | 208.00 | 82.90 | 24.79 | −44.72 |
| 2 | 13 | −33.00 | 22.74 | 6.49 | −8.60 |
| 3 | 20 | −106.77 | 3.95 | −0.09 | −2.26 |
| 4 | 23 | 57.71 | 146.86 | −15.60 | −128.59 |

Single lens data

| Lens | First surface | Focal length |
|---|---|---|
| 1 | 1 | 265.86 |
| 2 | 3 | −528.01 |
| 3 | 5 | 261.51 |
| 4 | 7 | −159.31 |
| 5 | 9 | 311.35 |
| 6 | 11 | 445.27 |
| 7 | 13 | −42.54 |
| 8 | 15 | −47.72 |
| 9 | 16 | 30.09 |
| 10 | 18 | −57.15 |
| 11 | 20 | −64.05 |
| 12 | 21 | 161.14 |
| 13 | 23 | 306.16 |
| 14 | 25 | 74.26 |
| 15 | 27 | 92.18 |
| 16 | 28 | −47.85 |
| 17 | 31 | 67.09 |
| 18 | 33 | −24.82 |
| 19 | 34 | 34.15 |
| 20 | 36 | −75.40 |
| 21 | 38 | 26.45 |
| 22 | 39 | −20.50 |
| 23 | 41 | 56.29 |

Numerical Embodiment 3

Unit mm

Surface data

| Surface number | r | d | nd | vd | Effective diameter |
|---|---|---|---|---|---|
| 1 | 157.510 | 3.24 | 1.77250 | 49.6 | 94.21 |
| 2 | 95.072 | 19.46 | 1.43387 | 95.1 | 90.72 |
| 3 | −191.109 | 1.00 | | | 89.88 |
| 4 | −166.514 | 2.59 | 1.77250 | 49.6 | 89.74 |
| 5 | −710.449 | 18.15 | | | 88.81 |
| 6 | 176.125 | 10.10 | 1.49700 | 81.5 | 83.31 |
| 7 | −264.901 | 0.12 | | | 82.83 |
| 8 | 131.655 | 5.69 | 1.43387 | 95.1 | 77.60 |
| 9 | 231.485 | (Variable) | | | 75.86 |
| 10* | 187.641 | 1.20 | 1.75500 | 52.3 | 38.10 |
| 11 | 29.330 | 7.31 | | | 34.12 |
| 12 | −89.656 | 1.20 | 1.59522 | 67.7 | 34.08 |
| 13 | 42.559 | 6.16 | 1.72047 | 34.7 | 34.15 |
| 14 | −149.500 | 2.87 | | | 34.07 |
| 15 | −43.838 | 1.20 | 1.59522 | 67.7 | 33.95 |
| 16 | 112.394 | 0.20 | | | 34.87 |
| 17 | 71.657 | 4.37 | 1.61340 | 44.3 | 35.34 |
| 18 | −190.404 | (Variable) | | | 35.43 |
| 19 | −74.782 | 1.20 | 1.81600 | 46.6 | 36.00 |
| 20 | 143.656 | 3.50 | 1.84666 | 23.8 | 37.59 |
| 21 | −433.333 | (Variable) | | | 38.19 |
| 22 | 159.347 | 5.57 | 1.72916 | 54.7 | 40.00 |
| 23* | −80.436 | 0.15 | | | 40.37 |
| 24 | 38.413 | 9.36 | 1.49700 | 81.5 | 40.44 |
| 25 | −136.507 | 1.20 | 2.00330 | 28.3 | 39.59 |
| 26 | 160.444 | 0.20 | | | 38.79 |
| 27 | 39.891 | 7.60 | 1.61800 | 63.3 | 38.11 |
| 28 | −325.501 | 12.60 | | | 36.98 |
| 29 (Stop) | ∞ | 1.97 | | | 24.20 |
| 30 | −385.088 | 0.90 | 1.88300 | 40.8 | 22.45 |
| 31 | 19.984 | 8.25 | 1.43875 | 94.9 | 20.69 |
| 32 | −29.856 | 1.50 | | | 19.87 |
| 33 | −25.114 | 4.24 | 1.65412 | 39.7 | 18.91 |
| 34 | −14.890 | 0.90 | 1.77250 | 49.6 | 18.77 |
| 35 | −98.116 | 2.38 | | | 19.00 |
| 36 | −66.091 | 0.80 | 1.81600 | 46.6 | 18.90 |
| 37 | 61.343 | 4.37 | 1.72047 | 34.7 | 19.64 |
| 38 | −34.826 | 30.44 | | | 20.39 |
| 39 | −249.121 | 2.56 | 1.61340 | 44.3 | 26.38 |
| 40 | −96.914 | (BF) | | | 26.70 |
| Image plane | ∞ | | | | |

Aspherical surface data

Tenth surface

K = 2.66952e+001    A4 = 1.14636e−008    A6 = −6.88265e−010
A8 = 5.30064e−013   A10 = −2.68365e−015  A12 = 3.77686e−018

Twenty-third surface

K = −1.35273e+000   A4 = 4.87432e−007    A6 = 6.89220e−011
A8 = 8.71132e−013   A10 = −1.68652e−015  A12 = 1.79632e−018

Various data
Zoom ratio 10.00

| | Wide angle | Intermediate | Telephoto |
|---|---|---|---|
| Focal length | 45.00 | 225.00 | 450.00 |
| F-number | 4.00 | 4.00 | 5.44 |
| Half angle of field | 19.01 | 3.94 | 1.97 |
| Image height | 15.50 | 15.50 | 15.50 |
| Total lens length | 345.16 | 345.16 | 345.16 |
| BF | 50.54 | 50.54 | 50.54 |

-continued

Unit mm

| | | | |
|---|---|---|---|
| d9 | 2.58 | 84.86 | 102.53 |
| d18 | 105.87 | 9.62 | 5.63 |
| d21 | 1.62 | 15.59 | 1.90 |
| Incident pupil position | 102.73 | 562.96 | 1088.73 |
| Exit pupil position | −67.31 | −67.31 | −67.31 |
| Front principal point position | 130.55 | 358.38 | −179.55 |
| Rear principal point position | 5.54 | −174.46 | −399.46 |

Zoom lens unit data

| Unit | First surface | Focal length | Lens structure length | Front principal point position | Rear principal point position |
|---|---|---|---|---|---|
| 1 | 1 | 165.00 | 60.36 | 34.98 | −13.68 |
| 2 | 10 | −35.00 | 24.52 | 2.61 | −15.92 |
| 3 | 19 | −115.00 | 4.70 | −0.60 | −3.16 |
| 4 | 22 | 48.04 | 94.98 | −2.27 | −99.60 |

Single lens data

| Lens | First surface | Focal length |
|---|---|---|
| 1 | 1 | −316.15 |
| 2 | 2 | 149.04 |

-continued

Unit mm

| | | |
|---|---|---|
| 3 | 4 | −280.78 |
| 4 | 6 | 213.86 |
| 5 | 8 | 689.93 |
| 6 | 10 | −45.99 |
| 7 | 12 | −48.15 |
| 8 | 13 | 46.29 |
| 9 | 15 | −52.65 |
| 10 | 17 | 84.96 |
| 11 | 19 | −59.82 |
| 12 | 20 | 126.53 |
| 13 | 22 | 73.71 |
| 14 | 24 | 61.23 |
| 15 | 25 | −72.76 |
| 16 | 27 | 57.75 |
| 17 | 30 | −21.37 |
| 18 | 31 | 28.67 |
| 19 | 33 | 47.73 |
| 20 | 34 | −22.72 |
| 21 | 36 | −38.84 |
| 22 | 37 | 31.31 |
| 23 | 39 | 255.57 |

Numerical Embodiment 4

Unit mm

Surface data

| Surface number | r | d | nd | vd | Effective diameter |
|---|---|---|---|---|---|
| 1 | 424.595 | 11.09 | 1.48749 | 70.2 | 126.35 |
| 2 | −594.285 | 0.20 | | | 125.51 |
| 3 | 173.957 | 19.89 | 1.43875 | 94.9 | 118.14 |
| 4 | −291.286 | 4.00 | 1.72047 | 34.7 | 116.31 |
| 5 | 807.691 | 16.85 | | | 113.22 |
| 6 | 442.688 | 8.68 | 1.43387 | 95.1 | 108.28 |
| 7 | −791.619 | 0.20 | | | 106.50 |
| 8 | 178.245 | 10.17 | 1.43875 | 94.9 | 101.53 |
| 9 | 6078.912 | 2.50 | 1.74950 | 35.3 | 99.95 |
| 10 | 701.579 | 3.00 | | | 98.21 |
| 11 | 1195.134 | 10.09 | 1.85478 | 24.8 | 96.69 |
| 12 | −211.097 | 2.20 | 1.74950 | 35.3 | 95.28 |
| 13 | 287.381 | (Variable) | | | 90.30 |
| 14* | 650.746 | 1.20 | 1.77250 | 49.6 | 34.49 |
| 15 | 29.914 | 5.46 | | | 31.13 |
| 16 | −1357.488 | 1.00 | 1.59522 | 67.7 | 30.87 |
| 17 | 31.724 | 6.97 | 1.72047 | 34.7 | 30.14 |
| 18 | −245.341 | 3.24 | | | 29.56 |
| 19 | −35.831 | 1.00 | 1.59522 | 67.7 | 29.30 |
| 20 | 189.754 | 0.20 | | | 29.59 |
| 21 | 95.865 | 2.86 | 1.72047 | 34.7 | 29.74 |
| 22 | −558.084 | (Variable) | | | 29.71 |
| 23 | −70.636 | 1.00 | 1.72916 | 54.7 | 35.49 |
| 24 | 124.130 | 2.96 | 1.85478 | 24.8 | 37.03 |
| 25 | −4972.820 | (Variable) | | | 37.47 |
| 26 | 133.386 | 6.41 | 1.60311 | 60.6 | 42.87 |
| 27* | −82.961 | 1.00 | | | 43.27 |
| 28 | 44.374 | 10.82 | 1.48749 | 70.2 | 43.66 |
| 29 | −115.328 | 5.00 | | | 42.62 |
| 30 (Stop) | ∞ | 2.00 | | | 37.50 |
| 31 | 73.236 | 7.38 | 1.43875 | 94.9 | 34.52 |
| 32 | −46.594 | 1.20 | 1.88300 | 40.8 | 33.02 |
| 33 | 75.284 | 13.46 | | | 31.40 |
| 34 | 47.133 | 6.57 | 1.58913 | 61.1 | 29.35 |
| 35 | −88.341 | 1.00 | | | 28.33 |
| 36 | 177.549 | 1.20 | 1.95375 | 32.3 | 26.28 |
| 37 | 18.943 | 4.80 | 1.64769 | 33.8 | 24.00 |
| 33 | 49.212 | 35.00 | | | 23.70 |
| 39 | 87.063 | 4.31 | 1.51633 | 64.1 | 29.91 |
| 40 | −110.328 | 15.29 | | | 29.91 |
| 41 | −67.625 | 1.00 | 1.88300 | 40.8 | 27.71 |
| 42 | 28.224 | 9.58 | 1.72825 | 28.5 | 28.46 |

-continued

Unit mm

| | | | | | |
|---|---|---|---|---|---|
| 43 | −31.135 | 4.91 | | | 28.98 |
| 44 | −21.870 | 1.00 | 1.95375 | 32.3 | 27.67 |
| 45 | −87.522 | 8.06 | 1.51742 | 52.4 | 30.38 |
| 46 | −21.424 | (BF) | | | 31.88 |
| Image plane | ∞ | | | | |

Aspherical surface data

Fourteenth surface

K = 2.35314e+002   A4 = 1.93318e−006   A6 = 4.20833e−010   A8 = −1.72913e−011
A10 = 1.51882e−013   A12 = −7.31823e−016   A14 = 1.83686e−018   A16 = −1.86030e−021

Twenty-seventh surface

K = −2.08328e+000   A4 = 4.85459e−007   A6 = 1.21437e−010   A8 = 1.41513e−013
A10 = 5.06031e−017   A12 = −2.55554e−019   A14 = −5.54086e−022   A16 = 1.16997e−024

Various data
Zoom ratio 19.40

| | Wide angle | Intermediate | Telephoto |
|---|---|---|---|
| Focal length | 50.00 | 400.00 | 970.00 |
| F-number | 4.50 | 4.50 | 8.00 |
| Half angle of field | 16.49 | 2.12 | 0.87 |
| Image height | 14.80 | 14.80 | 14.80 |
| Total lens length | 453.00 | 453.00 | 453.00 |
| BF | 55.00 | 55.00 | 55.00 |
| d13 | 4.00 | 111.70 | 129.65 |
| d22 | 130.93 | 5.52 | 12.60 |
| d25 | 8.32 | 26.02 | 1.00 |
| Incident pupil position | 161.92 | 1248.43 | 2562.17 |
| Exit pupil position | −170.62 | −170.62 | −170.62 |
| Front principal point position | 200.84 | 939.26 | −638.17 |
| Rear principal point position | 5.00 | −345.00 | −915.00 |

Zoom lens unit data

| Unit | First surface | Focal length | Lens structure length | Front principal point position | Rear principal point position |
|---|---|---|---|---|---|
| 1 | 1 | 230.00 | 88.86 | 4.21 | −58.90 |
| 2 | 14 | −32.50 | 21.93 | 3.40 | −12.18 |
| 3 | 23 | −109.50 | 3.96 | −0.11 | −2.27 |
| 4 | 26 | 68.70 | 140.00 | 18.78 | −175.06 |

Single lens data

| Lens | First surface | Focal length |
|---|---|---|
| 1 | 1 | 508.12 |
| 2 | 3 | 250.89 |
| 3 | 4 | −294.68 |
| 4 | 6 | 654.14 |
| 5 | 8 | 417.26 |
| 6 | 9 | −1051.34 |
| 7 | 11 | 208.61 |
| 8 | 12 | −160.99 |
| 9 | 14 | −40.43 |
| 10 | 16 | −51.88 |
| 11 | 17 | 39.14 |
| 12 | 19 | −50.38 |
| 13 | 21 | 112.99 |
| 14 | 23 | −61.34 |
| 15 | 24 | 140.39 |
| 16 | 26 | 85.43 |
| 17 | 28 | 67.00 |
| 18 | 31 | 65.98 |
| 19 | 32 | −32.26 |
| 20 | 34 | 52.92 |
| 21 | 36 | −22.15 |
| 22 | 37 | 44.44 |
| 23 | 39 | 94.60 |
| 24 | 41 | −22.31 |
| 25 | 42 | 21.64 |

-continued

| Unit mm | | |
|---|---|---|
| 26 | 44 | −30.58 |
| 27 | 45 | 52.40 |

TABLE 1

Values corresponding to the conditional expressions in Numerical Embodiments 1 to 4

| Conditional Expression | | Numerical Embodiment | | | |
|---|---|---|---|---|---|
| | | 1 | 2 | 3 | 4 |
| | fT | 810 | 1,200 | 450 | 970 |
| | f1 | 216.7 | 208 | 165 | 230 |
| | f2 | −30.0 | −33.0 | −35.0 | −32.5 |
| | f4 | 57.7 | 57.7 | 48.0 | 68.7 |
| | h41 | 4.09 | 4.46 | 3.54 | 3.84 |
| | hap | 3.31 | 4.01 | 2.04 | 3.27 |
| (1) | h41/hap | 1.24 | 1.11 | 1.73 | 1.17 |
| (2) | β4 | −2.42 | −2.18 | −2.13 | −2.35 |
| (3) | fT/f4 | 14.05 | 20.79 | 9.37 | 13.83 |
| (4) | fT/f1 | 3.74 | 5.77 | 2.73 | 4.13 |
| (5) | f1/f2 | −7.22 | −6.30 | −4.71 | −7.08 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122527, filed Jun. 13, 2014, which is hereby incorporated by reference herein in its entirety.

What is claimed is:

1. A zoom lens comprising, in order from an object side to an image side:
   a first lens unit having a positive refractive power that does not move for zooming;
   a second lens unit having a negative refractive power that moves during zooming;
   a third lens unit having a negative refractive power that moves during zooming; and
   a fourth lens unit having a positive refractive power that does not move for zooming and includes an aperture stop,
   the fourth lens unit including a first sub-lens unit arranged on the object side of the aperture stop, and a second sub-lens unit arranged on an image plane side of the aperture stop,
   wherein the following conditions are satisfied:

$1.1 < h41/hap < 2.0$ $-3.0 < β4 < -1.8$ where h41 represents a maximum height of an axial ray from an optical axis in the first sub-lens unit in a state in which focus is at infinity at a wide angle end, hap represents a maximum height of an axial ray from the optical axis at the aperture stop in a state of focusing on at infinity at the wide angle end and of full open aperture, and β4 represents a lateral magnification of the fourth lens unit in the state in which focus is at infinity at the wide angle end.

2. The zoom lens according to claim 1, wherein the following condition is satisfied:

$3.00 < fT/f4 < 30.00$ where f4 represents a focal length of the fourth lens unit, and fT represents a focal length of the zoom lens at a telephoto end.

3. The zoom lens according to claim 1, wherein the following condition is satisfied:

$1.50 < fT/f1 < 10.00$ where f1 represents a focal length of the first lens unit and fT represents a focal length of the zoom lens at a telephoto end.

4. The zoom lens according to claim 1, wherein the following condition is satisfied:

$-10.00 < f1/f2 < -2.500$ where f1 represents a focal length of the first lens unit and f2 represents a focal length of the second lens unit.

5. The zoom lens according to claim 1, wherein the first sub-lens unit includes at least one aspherical surface.

6. The zoom lens according to claim 1, wherein the zoom lens performs focusing with a lens unit disposed on the object side of the aperture stop.

7. The zoom lens according to claim 1, wherein the aperture stop does not move for zooming.

8. An image pickup apparatus, comprising:
   a zoom lens comprising, in order from an object side to an image side:
      a first lens unit having a positive refractive power that does not move for zooming;
      a second lens unit having a negative refractive power that moves during zooming;
      a third lens unit having a negative refractive power that moves during zooming; and
      a fourth lens unit having a positive refractive power that does not move for zooming and includes an aperture stop,
      the fourth lens unit including a first sub-lens unit arranged on the object side of the aperture stop, and a second sub-lens unit arranged on an image plane side of the aperture stop,
   wherein the following conditions are satisfied:

$1.1 < h41/hap < 2.0$ $-3.0 < β4 < -1.8$ where h41 represents a maximum height of an axial ray from an optical axis in the first sub-lens unit in a state in which focus is at infinity at a wide angle end, hap represents a maximum height of an axial ray from an optical axis at the aperture stop in a state of focusing on at infinity at the wide angle end and of full open aperture, and β4 represents a lateral magnification of the fourth lens unit in the state in which focus is at infinity at the wide angle end; and
      an image pickup element that photoelectrically converts an optical image formed by the zoom lens.

* * * * *